United States Patent [19]
Billingsley

[11] 4,139,309
[45] Feb. 13, 1979

[54] APPARATUS AND METHOD

[75] Inventor: John G. S. Billingsley, Newark, Del.

[73] Assignee: E. I. Du Pont de Nemours and Company, Wilmington, Del.

[21] Appl. No.: 859,188

[22] Filed: Dec. 9, 1977

[51] Int. Cl.² ............................................. B01F 15/02
[52] U.S. Cl. ....................................... 366/186; 264/37
[58] Field of Search ............... 366/186, 241, 295, 296, 366/76, 320, 321, 156, 323, 339, 341, 348; 264/37, 140

[56] References Cited

U.S. PATENT DOCUMENTS

| | | | |
|---|---|---|---|
| 2,991,870 | 7/1961 | Griffith | 366/186 X |
| 3,183,553 | 5/1965 | Slater | 366/186 X |
| 3,193,601 | 7/1968 | Billingsley | 264/142 |
| 3,655,313 | 4/1972 | Kunogi | 425/130 |
| 3,920,229 | 11/1975 | Piggott | 366/156 |
| 3,976,730 | 8/1976 | Cushing | 264/37 |
| 4,013,745 | 3/1977 | Brinkman | 264/37 |

*Primary Examiner*—Edward J. McCarthy

[57] ABSTRACT

An apparatus and method for feeding scrap thermoplastic material to a screw compactor for further processing the scrap material. Means are located in the material flow stream above the compactor for mixing the scrap material and discharging it from a storage zone to the compactor at substantially zero pressure.

7 Claims, 3 Drawing Figures

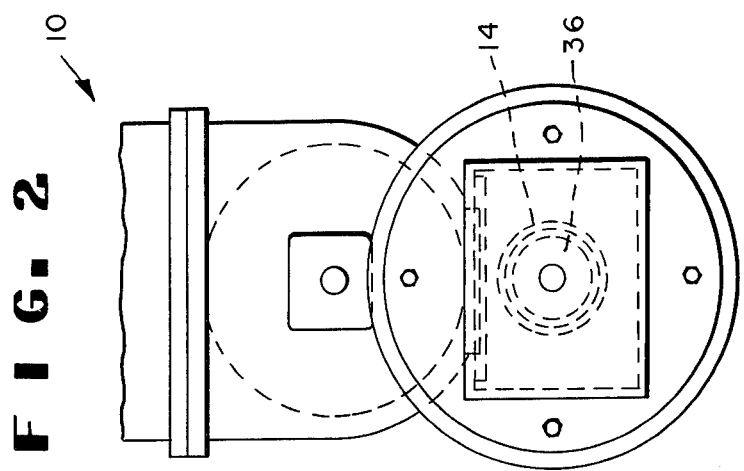
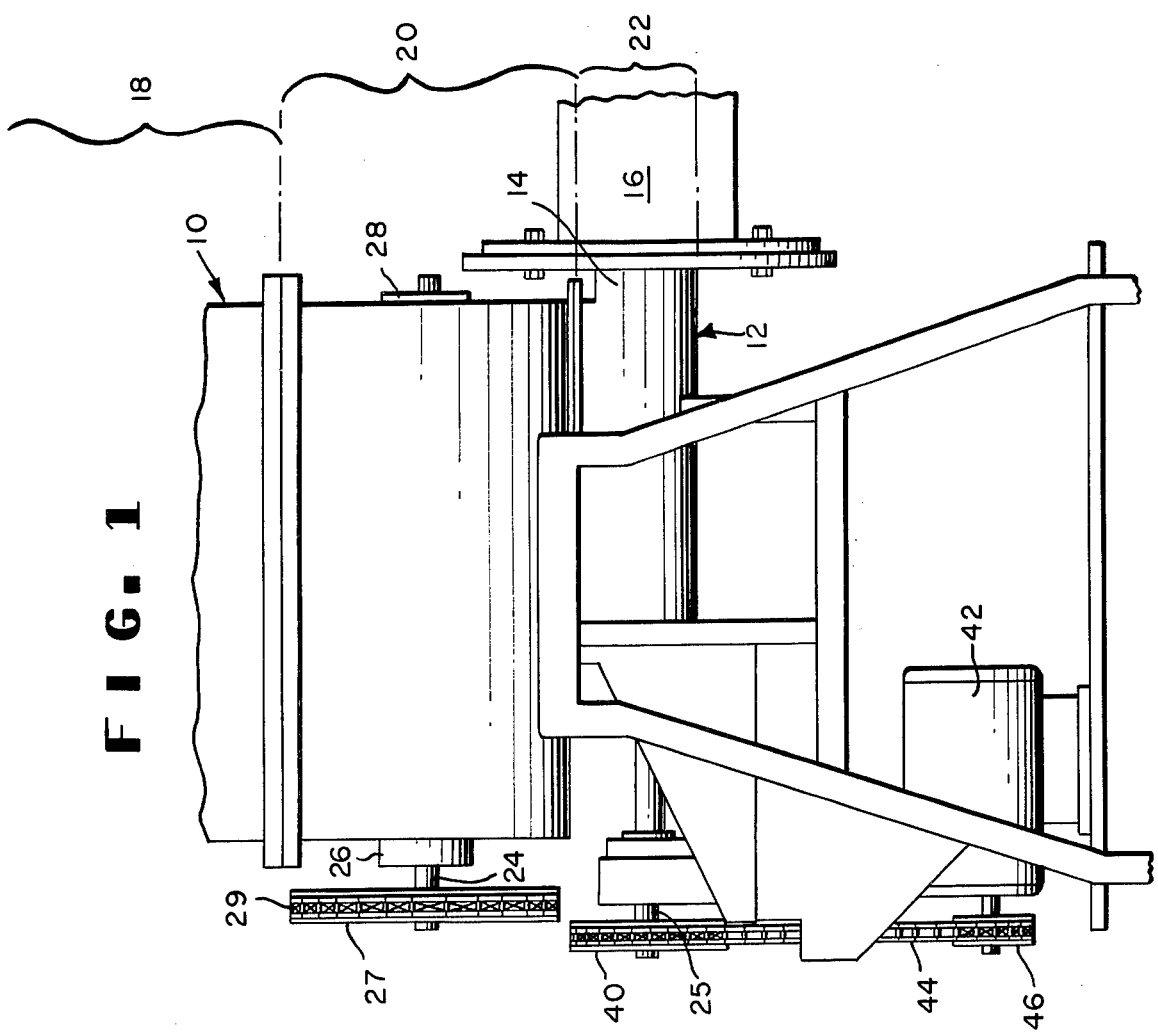

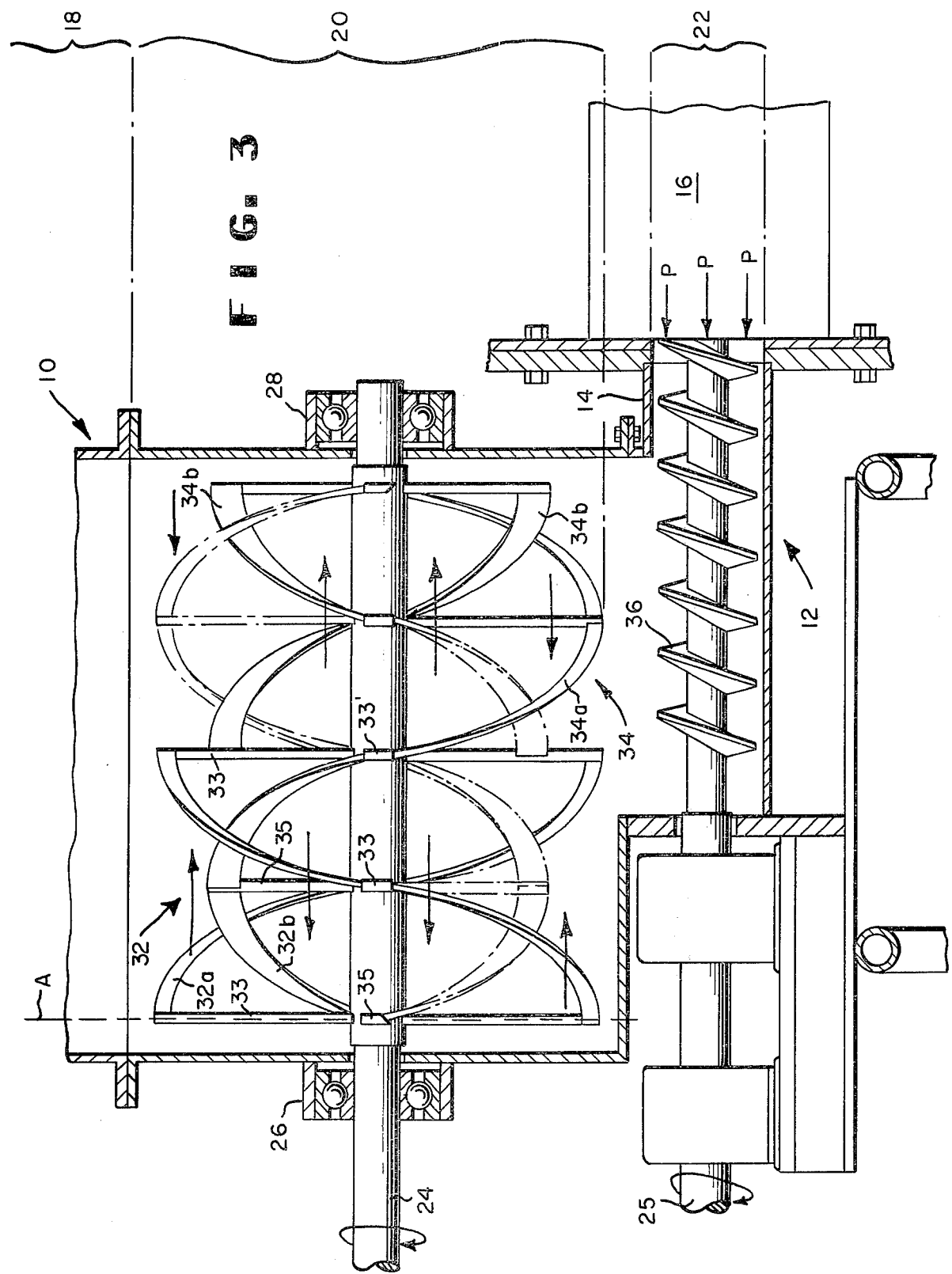

APPARATUS AND METHOD

BACKGROUND OF THE INVENTION

This invention relates to the reclamation of thermoplastic scrap material such as cut film, fabric or yarn, etc., and more particularly to an apparatus and method for feeding the scrap material to and through a screw compactor for further processing the scrap material.

In the manufacture of extruded-shaped structures such as fibers and films, as well as molded objects from thermoplastic resins, a substantial amount of thermoplastic scrap material is produced. In order to effect acceptable economics in manufacture it is necessary to convert the scrap material into a form in which it can be reused.

One way of doing this is described in U.S. Pat. No. 3,193,601 which briefly stated discloses the steps of (1) continuously passing a composite mass of variable low bulk density, comprising essentially particulate thermoplastic resin through a tapered screw compactor, said compactor being driven through a preselected controlled torque to place the compacted mass of particulate thermoplastic resin issuing from said compactor under a constant pressure within the range of from 75 pounds per square inch (p.s.i.) to just below the pressure at which said compacted material would be converted into melt form, (2) continuously advancing said compacted material issuing under said constant pressure from said compactor directly into an extruder, (3) heating said mass in said extruder to a temperature effective to convert the thermoplastic resin to the molten state, and (4) thereafter continuously extruding the molten resin through extrusion dies. Preferably the extrudate is subsequently cut into particles or pellets of uniform dimension, the mass of said pellets having a uniform bulk density substantially higher than the bulk density of the mass of particulate thermoplastic resin material fed to the compactor.

This method and apparatus as well as other methods and apparatus such as that described in U.S. Pat. No. 3,389,203 are useful in converting scrap thermoplastic material into discrete particles of a form which can be readily reused. However, when attempts are made to increase the productivity of such processes, difficulties in feeding and controlling the degree and uniformity of compaction are encountered.

SUMMARY OF THE INVENTION

These difficulties are overcome by a feeding apparatus which comprises a generally upright hopper having from top to bottom, storing, agitating and transfer zones, a material transfer conduit communicating with said transfer zone and having its outlet connected to a meams for reprocessing the scrap material, said agitating zone including a first driven shaft extending across said agitating zone, means on said first shaft for mixing scrap and discharging the scrap material from the storing zone to the transfer zone at substantially zero pressure; a second separately driven shaft extending through said transfer zone into said material transfer conduit; and a spiral screw flight attached to the second shaft below said means for mixing the material and discharging the material from the storing zone, said spiral screw flight extending about one screw pitch length into said transfer conduit in close proximity to said conduit for compacting said material at the outlet of said conduit, against pressure generated in said means for reprocessing the scrap material. The method of operation involves a process that includes the steps of continuously compacting a continuous stream of thermoplastic scrap material in a screw compactor driven by a controlled torque device to place the scrap material issuing from said compactor under a constant pressure within the range of 75 psi to just below the pressure at which the scrap material would be converted to melt form continuously melting and discharging the scrap material in reusable form, the improvement in feeding the stream of scrap material to the screw compactor comprising: storing the material in a hopper located above the screw compactor; mixing the scrap material and discharging the scrap material onto the feed section of the screw compactor at substantially zero pressure by means of a ribbon agitator in said hopper driven separately by a drive not associated with the controlled torque device, whereby the controlled torque device is unaffected by the torque requirements of the ribbon agitator used for mixing.

BRIEF DESCRIPTION OF THE DRAWING

FIGS. 1 and 2 are schematic side and end elevation drawings showing apparatus for converting scrap thermoplastic material into reusable form.

FIG. 3 is a vertical cross-sectioned view of the feeder and compaction screw of FIG. 1.

DETAILED DESCRIPTION OF THE PREFERRED EMBODIMENT

Referring to the drawing, a thermoplastic scrap material in the form of cut yarn, cut film or cut fabric is charged into feed hopper 10 from which the scrap material is fed to a screw compactor 12 which advances the material into a transfer conduit 14 where it is compacted at the outlet of the conduit against the back pressure (indicated by arrows P) generated in the reprocessing unit 16 and fed into the unit 16 where it is melted into pieces of desired size as described in U.S. Pat. No. 3,389,203. Alternatively, the compacted material may be fed into the feed throat of a melt extruder provided with an extrusion die as described in U.S. Pat. No. 3,193,601.

The feed hopper 10 is a generally upright box having from top to bottom a storing zone 18, an agitating zone 20, and a transfer zone 22. A material transfer conduit 14 leads from the transfer zone to the reprocessing unit 16. Extending through the agitating zone 20 is a first shaft 24 rotatably supported at its opposite ends by bearings 26, 28. A sprocket 27 is located on the end of shaft 24 adjacent bearing 26 and is driven through chain 29 by a motor (not shown). Mounted to shaft 24 are a pair of interrupted flights 32, 34 each comprised of an open double ribbon arrangement of coaxial spiral flights having different diameters and being of opposite hand. For example, helical flights 32 include flights 32a and 32b attached to spokes extending from shaft 24. The outer flight 32a is a ribbon of narrow width compared to its diameter which almost fills the agitating zone 20 of the hopper 10. The outer flight is attached to spokes 33 extending outwardly from and normal to the axis of the shaft 24. The inner flight 32b is also a narrow ribbon flight having a diameter somewhat less than that of outer flight 32a and the inner flight also forms as helix of opposite hand with the helix formed by the outer flight. The inner flight is attached to spokes 35 (and also 33' at the middle of shaft 24) which also extend outwardly and normal to the axis of shaft 24. Spokes 33 and 35 are contained in parallel planes spaced along the length of shaft 24 and the spokes are angularly disposed with respect to each other in each plane. For example, in the embodiment shown in FIG. 3, in plane A, the spokes 33 are disposed 90° from spokes 35. In operation, when shaft 24 is turned in the direction indicated by the rotational arrow, the material near the shaft 24 moves from the center outward and the material near the outside of the outer flight 32a moves from the ends inward as indicated by the arrows. Outer and inner flights 34a and 34b, respectively, are formed and operate in the same fashion, as described in connection with flights 32a and 32b, but these flights are of opposite hand compared with 32a and 32b, respectively. This structural configuration eliminates any material packing at the discharge from the agitating zone and at the agitator ends and prevents the material from lodging then packing between the flights and their supporting spokes. In addition, the circulation afforded by the action of the flights 32, 34 tends to keep the bulk density of the scrap material uniform as well as mixing various cut lengths or sizes of material to make this more uniform prior to transfer.

The agitation action of the flights 32, 34 also acts to support the head of material in the storage zone 18 of the hopper. With this arrangement it is possible to discharge from the agitation zone of the hopper with a material held in the storage zone of from up to 20 to 30 feet or greater at substantially zero pressure. For some scrap materials it may be desirable to increase the length of flights 32, 34 to that as shown in phantom in FIG. 3.

The scrap material then proceeds to the spiral flight screw 36 on a second shaft 25 which is located below the shaft 24 and has one end that extends through the transfer zone to the end of material transfer conduit 14. The length of conduit 14 is illustrated to be about one screw pitch length. However, the conduit could be as short as approximately ¼ screw pitch length with equally satisfactory results. The flight which is closely sized to the walls of conduit 14 compacts the scrap material against back pressure P (indicated by arrows) generated in the reprocessing unit 16. The screw is driven via the sprocket 40 attached to the end of its shaft which is in turn connected to the drive 42 via chain 44 and sprocket 46 on the drive shaft. The drive 42 is a drive that applies controlled torque to the screw such as the one described in U.S. Pat. No. 3,193,601.

By providing separate drives for the agitator located in zone 20 and the compaction screw 36 and by keeping the friction drag of screw 36 to conduit 14 to a minimum by setting the length of the conduit to about one screw pitch length or less, it is possible to match the input torque applied to screw 36 closely to back pressure P generated in reprocessing unit 16 unaffected by extraneous torque requirements which affect product uniformity and throughput as from mixing with a common drive and longer extensions of the screw into the material transfer conduit as shown in the prior art.

Use of the feed process and apparatus described above has increased productivity of the equipment approximately three-fold when processing scrap polyester terephthalate fiber. In addition, the system is less subject to jams and product physical uniformity is improved.

I claim:

1. An apparatus for feeding thermoplastic scrap material comprising: a generally upright hopper having from top to bottom, storing, agitating and transfer zones, a material transfer conduit communicating with said transfer zone and having its outlet connected to a means for reprocessing the scrap material, said agitating zone including a first driven shaft extending across said agitating zone, means on said first shaft for mixing scrap and discharging the scrap material from the storing zone to the transfer zone at substantially zero pressure; a second separately driven shaft extending through said transfer zone into said material transfer conduit; and a spiral screw flight attached to the second shaft below said means for mixing the material and discharging the material from the storing zone, said spiral screw flight extending into said transfer conduit in close proximity to said conduit for compacting said material at the outlet of said conduit against pressure generated in said means for reprocessing the scrap material, said transfer conduit being less than about one screw pitch length of said spiral screw flight.

2. The apparatus as defined in claim 1 wherein said first and second shafts are generally disposed in a horizontal position, said second shaft being directly below said first shaft.

3. The apparatus as defined in claim 1 wherein the means on said first shaft for mixing and discharging said material comprises: a pair of coaxial spiral flights having different diameters and being of opposite hand and each flight having sections of opposite hand, said spiral flights being attached to said first shaft by spokes.

4. The apparatus as defined in claim 1, wherein is provided means for regulating torque applied to said second shaft.

5. An apparatus for feeding thermoplastic scrap material comprising: a generally upright hopper having from top to bottom, storing, agitating and transfer zones, a material transfer conduit communicating with said transfer zone and having its outlet connected to a means for reprocessing the scrap material, said agitating zone including a first driven shaft extending across said agitating zone; a pair of coaxial spiral flights having different diameters and being of opposite hand and each flight having sections of opposite hand, said spiral flights being attached to said first shaft by spokes located in planes normal to and spaced along the first shaft, in each of said planes the spokes supporting the flights of one diameter being angularly disposed from the spokes supporting the flights of the other diameter; a second driven shaft extending through said transfer zone into said material transfer conduit; and a spiral screw flight attached to the second shaft below said means for mixing the material and discharging the material from the storing zone, said spiral screw flight extending into said transfer conduit in close proximity to said conduit for compacting said material at the outlet of said conduit against pressure generated in said means for reprocessing the scrap material, said transfer conduit being less than about one screw pitch length of said spiral screw flight.

6. The apparatus as defined in claim 5 wherein said first and second shafts are generally disposed in a horizontal position, said second shaft being directly below said first shaft.

7. In a process that includes the steps of continuously mixing, feeding and compacting a continuous stream of thermoplastic scrap material in an apparatus driven by a controlled torque device to place the scrap material issuing from said apparatus under a constant pressure within the range of 75 psi to just below the pressure at which the scrap material would be converted to melt form, and continuously processing the scrap material to reusable form, the improvement comprising: storing the thermoplastic material in a hopper located above the apparatus for compacting the material; mixing the scrap material and discharging the scrap material onto the feeding portion of the compacting step at substantially zero pressure by means of a ribbon agitator in said hopper driven separately by a drive not associated with the controlled torque device, whereby the controlled torque device is unaffected by the torque requirements of the ribbon agitator used for mixing.

* * * * *